US011503643B2

(12) United States Patent
Chen

(10) Patent No.: US 11,503,643 B2
(45) Date of Patent: Nov. 15, 2022

(54) RANDOM ACCESS METHOD AND DEVICE

(71) Applicant: China Academy of Telecommunications Technology, Beijing (CN)

(72) Inventor: Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/323,257

(22) PCT Filed: May 17, 2017

(86) PCT No.: PCT/CN2017/084629
§ 371 (c)(1),
(2) Date: Feb. 5, 2019

(87) PCT Pub. No.: WO2018/024011
PCT Pub. Date: Feb. 8, 2018

(65) Prior Publication Data
US 2019/0182872 A1 Jun. 13, 2019

(30) Foreign Application Priority Data
Aug. 5, 2016 (CN) .......................... 201610639259.X

(51) Int. Cl.
*H04W 74/08* (2009.01)
*H04W 48/16* (2009.01)
*H04W 72/04* (2009.01)

(52) U.S. Cl.
CPC ....... *H04W 74/0833* (2013.01); *H04W 48/16* (2013.01); *H04W 72/0446* (2013.01)

(58) Field of Classification Search
CPC .......... H04W 74/002; H04W 72/0446; H04W 72/04; H04W 48/16
See application file for complete search history.

(56) References Cited

U.S. PATENT DOCUMENTS 10,383,151 B2 * 8/2019 Chatterjee ......... H04W 74/0833
10,420,149 B2 * 9/2019 Wang ................... H04L 1/0029
(Continued)

FOREIGN PATENT DOCUMENTS

CN  101577920 A  11/2009
CN  103340007 A  10/2013
(Continued)

OTHER PUBLICATIONS

U.S. Appl. No. 62/353,533; Hwang, "Prach Resource Selection for Mixed Numerology", 2016 (Year: 2016/2018) (Year: 2016).*
(Continued)

*Primary Examiner* — Ricardo H Castaneyra
(74) *Attorney, Agent, or Firm* — Kilpatrick Townsend & Stockton, LLP

(57) ABSTRACT

Disclosed are a random access method and device for solving the problem in which random access procedures of traditional LTE systems cannot be performed properly in 5G systems. The method comprises: a terminal determining a transmission parameter to be used by said terminal for data transmission, the transmission parameter comprising an operation bandwidth and/or a baseband parameter; the terminal sending, according to the transmission parameter, a random access request; and the terminal using the transmission parameter to receive a random access response corresponding to the random access request. The invention realizes random access in a 5G system, thereby increasing the access success rate.

14 Claims, 13 Drawing Sheets

S21
A terminal determines a transmission parameter for the terminal to transmit data, where the transmission parameter includes an operating bandwidth and/or a numerology S22
The terminal transmits a random access request according to the transmission parameter S23
The terminal receives a random access response corresponding to the random access request using the transmission parameter

(56) References Cited

U.S. PATENT DOCUMENTS

| | | | |
|---|---|---|---|
| 2013/0083753 A1 | 4/2013 | Lee et al. | |
| 2014/0133433 A1 | 5/2014 | Ahn et al. | |
| 2015/0023281 A1 | 1/2015 | Wu | |
| 2015/0282215 A1* | 10/2015 | Eriksson | H04W 74/0833 |
| | | | 370/329 |
| 2017/0201968 A1* | 7/2017 | Nam | H04L 5/0048 |
| 2017/0367120 A1* | 12/2017 | Murray | H04B 7/0695 |
| 2018/0035421 A1* | 2/2018 | Lin | H04W 74/006 |
| 2018/0310344 A1* | 10/2018 | Zhou | H04W 74/08 |
| 2019/0037579 A1* | 1/2019 | Yi | H04L 5/001 |
| 2019/0150158 A1* | 5/2019 | Farmanbar | H04W 28/0247 |
| | | | 370/329 |
| 2019/0223157 A1* | 7/2019 | Hwang | H04L 27/2602 |
| 2019/0387518 A1* | 12/2019 | Au | H04L 5/0092 |

FOREIGN PATENT DOCUMENTS

| | | |
|---|---|---|
| CN | 104488346 A | 4/2015 |
| CN | 105517182 A | 4/2016 |
| CN | 105723792 A | 6/2016 |
| JP | 2015526962 A | 9/2015 |
| KR | 20090074228 A | 7/2009 |
| KR | 20140010158 A | 1/2014 |
| WO | 2016004634 A1 | 1/2016 |
| WO | 2016047106 A1 | 3/2016 |
| WO | 2016106496 A1 | 7/2016 |

OTHER PUBLICATIONS

Samsung, "Numerology and frame structure for 5G new radio interface: over-6GHz", 3GPP TSG RAN WG1 Meeting #84bis, Busan, Korea, Apr. 11-15, 2016, total 5 pages, R1-162180.

* cited by examiner

RANDOM ACCESS METHOD AND DEVICE

This application is a National Stage of International Application No. PCT/CN2017/084629, filed May 17, 2017, which claims priority to Chinese Patent Application No. 201610639259.X, filed Aug. 5, 2016, both of which are hereby incorporated by reference in their entireties.

FIELD

The present invention relates to the field of communications, and particularly to a random access method and device.

BACKGROUND

Random accesses in a Long Term Evolution (LTE) system include a contention random access and a non-contention random access.

I. A contention random access is generally used for an initial access of a terminal, a Radio Resource Control (RRC) connection reestablishment, a handover, downlink data arrival in a RRC connected state in an asynchronous state, uplink data arrival in the RRC connected state, positioning in the RRC connected state, etc. As illustrated in FIG. 1A, a contention random access procedure includes the following operations.

1) Message 1 (Msg1): A Random Access Preamble.

Particularly, a User Equipment (UE) selects a random access preamble and a Physical Random Access Channel (PRACH) resource, and transmits the selected random access preamble to a base station over the PRACH resource.

2) Msg2: A Random Access Response.

Particularly, the base station calculates a Time Alignment (TA) upon reception of the preamble, and transmits the random access response to the UE, where the random access response includes the time alignment, an uplink (UL) grant for Msg3, and a temporary Cell-Radio Network Temporary Identifier (C-RNTI) allocated by the network side. A Physical Downlink Control Channel (PDCCH) bearing a scheduling message of Msg2 is scrambled using a Random Access-Radio Network Temporary Identifier (RA-RNTI) corresponding uniquely to a time-frequency resource over which Msg1 is transmitted in a 10 ms window. Moreover, Msg2 further carries a preamble ID, and the UE determines that Msg2 corresponds to Msg1 transmitted by the UE, according to the RA-RNTI and the preamble ID.

3) Msg3: Scheduled Transmission.

Particularly, the UE sends uplink transmission over the UL grant specified by Msg2, where uplink transmission of Msg3 varies from one random access reason to another, and for example, for an initial access, an RRC connection establishment request is transmitted in Msg3.

4) Msg4: Contention Resolution.

Particularly, the UE can determine whether the random access succeeds according to Msg4. For the initially accessing UE, the temporary C-RNTI is translated automatically into a unique UE identifier of the UE in the cell upon successful contention resolution.

II. A non-contention random access is generally used for a handover, downlink data arrival, positioning, obtaining uplink timing, etc. As illustrated in FIG. 1B, a procedure thereof includes the following operations.

1) Msg0: RA Preamble Assignment.

Particularly, the base station assigns for the UE a dedicated preamble for the non-contention random access, and a PRACH resource for the random access.

2) Msg1: A Random Access Preamble.

Particularly, the UE transmits the specified dedicated preamble to the base station over the specified PRACH resource as indicated in Msg0. The base station calculates an uplink Time alignment (TA) according to Msg1 upon reception of Msg1.

3) Msg2: A Random Access Response.

The base station transmits the random access response to the UE, where the random access response includes the time alignment, and an UL grant for allocating a subsequent uplink transmission resource, where the time alignment defines a timing relationship of subsequent uplink transmission by the UE.

All the random access procedures in the LTE system can be performed throughout the operating bandwidth of the cell. In the LTE system, the reception bandwidth of the UE is 20 MHz, and the largest bandwidth of the cell is 20 MHz, so the UE always can receive and transmit the messages in the random access procedures at any resource positions of the cell. Moreover, there is only one set of numerology (including a sub-carrier spacing, a symbol length, etc.) in a cell of the LTE system, and the UE can simply operate with the numerology in a random access procedure. A series of new characteristics are introduced to the next generation of wireless communication system, i.e., a 5G system.

1. A network-side transmission point (e.g., an eNB, a Distributed Unit (DU), etc.) can operate over a large bandwidth (e.g., 100 MHz), and the operating bandwidth over which the UE transmits data may be smaller than the bandwidth of the network-side transmission point, so the randomly accessing UE cannot listen to and receive a message in a random access procedure over the transmission bandwidth of the network-side transmission point.

2. A plurality of sets of numerologies are introduced, and the plurality of sets of numerologies may coexist in a frequency- or time-division mode over the bandwidth of a network-side transmission point. The plurality of sets of numerologies are introduced due to: 1) demands of different terminals, e.g., Ultra-Reliable and Low-Latency Communication (URLLC), where the UE requires an extremely low latency, so a shorter symbol length is desirable; and 2) a demand for introducing a plurality of carrier frequencies and UE speeds, where the sub-carrier spacing of 15 KHz, and the corresponding symbol length, in the LTE system become unsatisfactory in operation at 30 GHz, for example, so a larger sub-carrier spacing and a short symbol length shall be introduced. Accordingly, the UE in a random access procedure needs to know over which operating bandwidth and with which numerology to perform the random access procedure. If the capability of the UE is limited to operating with only a part of the numerologies, then the UE will not operate normally at all if it cannot determine the operating bandwidth and the numerology in the random access procedure.

In summary, as the new characteristics of the 5G system are introduced, the bandwidth of the network-side transmission point may be larger than the operating bandwidth of the UE, and there may be a plurality of sets of numerologies for the network-side transmission point, so that a random access procedure in the traditional LTE system cannot be performed normally in the 5G system. There has been absent so far a solution to a random access in the 5G system.

SUMMARY

Embodiments of the invention provide a random access method and device so as to address the problem in the prior art that a random access procedure in the traditional LTE system cannot be performed normally in the 5G system.

In a first aspect, there is provided a random access method including: determining, by a terminal, a transmission parameter for the terminal to transmit data, where the transmission parameter includes an operating bandwidth and/or a numerology; transmitting, by the terminal, a random access request according to the transmission parameter; and receiving, by the terminal, a random access response corresponding to the random access request using the transmission parameter.

In a possible implementation, the transmission parameter is preset, or the transmission parameter is determined by the terminal according to its own capability and/or traffic demand.

In a possible implementation, transmitting, by the terminal, the random access request according to the transmission parameter includes: determining, by the terminal, a preamble group corresponding to the operating bandwidth of the terminal according to a correspondence relationship between preamble groups and operating bandwidths, or determining a preamble group corresponding to the numerology of the terminal according to a correspondence relationship between preamble groups and numerologies; and selecting, by the terminal, a preamble from the determined preamble group, and transmitting it as the random access request.

In a possible implementation, transmitting, by the terminal, the random access request according to the transmission parameter includes: determining, by the terminal, a resource group corresponding to the operating bandwidth of the terminal according to a correspondence relationship between resource groups and operating bandwidths, or determining a resource group corresponding to the numerology of the terminal according to a correspondence relationship between resource groups and numerologies; and transmitting, by the terminal, the random access request over a transmission resource in the determined resource group.

In a possible implementation, transmitting, by the terminal, the random access request according to the transmission parameter includes: transmitting, by the terminal, the random access request over a transmission resource in the operating bandwidth of the terminal; or transmitting, by the terminal, the random access request over a transmission resource in an operating bandwidth of the numerology of the terminal, or a transmission resource in a Transmission Time Interval (TTI) with a sub-frame type of the numerology of the terminal.

In a possible implementation, the method further includes: transmitting, by the terminal, uplink transmission scheduled by the random access response using the transmission parameter; and receiving, by the terminal, a contention resolution message using the transmission parameter.

In a second aspect, there is provided a random access method including: determining, by a network-side transmission point, a transmission parameter for transmitting a random access response corresponding to a random access request upon reception of the random access request; and transmitting, by the network-side transmission point, the random access response using the transmission parameter.

In a possible implementation, the transmission parameter is preset, or the transmission parameter is determined by the network-side transmission point according to the random access request.

In a possible implementation, determining, by the network-side transmission point, the transmission parameter for transmitting the random access response corresponding to the random access request includes: determining, by the network-side transmission point, an operating bandwidth corresponding to a preamble group including a preamble in the random access request according to a correspondence relationship between preamble groups and operating bandwidths, and determining the determined operating bandwidth as an operating bandwidth for transmitting the random access response; or determining, by the network-side transmission point, a numerology corresponding to a preamble group including a preamble in the random access request according to a correspondence relationship between preamble groups and numerologies, and determining the determined numerology as a numerology for transmitting the random access response.

In a possible implementation, determining, by the network-side transmission point, the transmission parameter for transmitting the random access response corresponding to the random access request includes: determining, by the network-side transmission point, an operating bandwidth corresponding to a resource group including a transmission resource over which the random access request is received, according to a correspondence relationship between resource groups and operating bandwidths, and determining the determined operating bandwidth as an operating bandwidth for transmitting the random access response; or determining, by the network-side transmission point, a numerology corresponding to a resource group including a transmission resource over which the random access request is received, according to a correspondence relationship between resource groups and numerologies, and determining the determined numerology as a numerology for transmitting the random access response.

In a possible implementation, determining, by the network-side transmission point, the transmission parameter for transmitting the random access response corresponding to the random access request includes: determining, by the network-side transmission point, an operating bandwidth including a transmission resource over which the random access request is received, as an operating bandwidth for transmitting the random access response; or determining, by the network-side transmission point, a numerology of an operating bandwidth including a transmission resource over which the random access request is received, as a numerology for transmitting the random access response; or determining, by the network-side transmission point, a sub-frame type of a TTI including a transmission resource over which the random access request is received, and determining a numerology of the sub-frame type as a numerology for transmitting the random access response.

In a possible implementation, the method further includes: receiving, by the network-side transmission point, uplink transmission scheduled by the random access response using the transmission parameter; and transmitting, by the network-side transmission point, a contention resolution message using the transmission parameter.

In a third aspect, there is provided a computer readable storage medium storing executable program codes configured to perform the method according to the first aspect.

In a fourth aspect, there is provided a computer readable storage medium storing executable program codes configured to perform the method according to the second aspect.

In a fifth aspect, there is provided a terminal including: a determining module configured to determine a transmission parameter for the terminal to transmit data, where the transmission parameter includes an operating bandwidth and/or a numerology; a transmitting module configured to transmit a random access request according to the transmission parameter; and a receiving module configured to receive a random access response corresponding to the random access request using the transmission parameter.

In a possible implementation, the transmission parameter is preset, or the transmission parameter is determined by the terminal according to its own capability and/or traffic demand.

In a possible implementation, the transmitting module is configured to: determine a preamble group corresponding to the operating bandwidth of the terminal according to a correspondence relationship between preamble groups and operating bandwidths, or determine a preamble group corresponding to the numerology of the terminal according to a correspondence relationship between preamble groups and numerologies; and select a preamble from the determined preamble group, and transmit it as the random access request.

In a possible implementation, the transmitting module is configured to: determine a resource group corresponding to the operating bandwidth of the terminal according to a correspondence relationship between resource groups and operating bandwidths, or determine a resource group corresponding to the numerology of the terminal according to a correspondence relationship between resource groups and numerologies; and transmit the random access request over a transmission resource in the determined resource group.

In a possible implementation, the transmitting module is configured to: transmit the random access request over a transmission resource in the operating bandwidth of the terminal; or transmit the random access request over a transmission resource in an operating bandwidth of the numerology of the terminal, or a transmission resource in a Transmission Time Interval (TTI) with a sub-frame type of the numerology of the terminal.

In a possible implementation, the transmitting module is further configured to transmit uplink transmission scheduled by the random access response using the transmission parameter; and the receiving module is further configured to receive a contention resolution message using the transmission parameter.

In a sixth aspect, there is provided another terminal including a processor, a transceiver, and a memory, where the processor is configured to read and execute programs in the memory to: determine a transmission parameter for the terminal to transmit data, where the transmission parameter includes an operating bandwidth and/or a numerology; transmit a random access request according to the transmission parameter through the transceiver; and control the transceiver to receive a random access response corresponding to the random access request using the transmission parameter; and the transceiver is configured to receive and transmit data under the control of the processor.

In a possible implementation, the transmission parameter is preset, or the transmission parameter is determined by the terminal according to its own capability and/or traffic demand.

In a possible implementation, the processor is configured to read and execute the programs in the memory to: determine a preamble group corresponding to the operating bandwidth of the terminal according to a correspondence relationship between preamble groups and operating bandwidths, or determine a preamble group corresponding to the numerology of the terminal according to a correspondence relationship between preamble groups and numerologies; and select a preamble from the determined preamble group and transmit it as the random access request.

In a possible implementation, the processor is configured to read and execute the programs in the memory to: determine a resource group corresponding to the operating bandwidth of the terminal according to a correspondence relationship between resource groups and operating bandwidths, or determine a resource group corresponding to the numerology of the terminal according to a correspondence relationship between resource groups and numerologies; and control the transceiver to transmit the random access request over a transmission resource in the determined resource group.

In a possible implementation, the processor is configured to read and execute the programs in the memory to: control the transceiver to transmit the random access request over a transmission resource in the operating bandwidth of the terminal; or control the transceiver to transmit the random access request over a transmission resource in an operating bandwidth of the numerology of the terminal, or a transmission resource in a Transmission Time Interval (TTI) with a sub-frame type of the numerology of the terminal.

In a possible implementation, the processor is further configured to read and execute the programs in the memory to: control the transceiver to transmit uplink transmission scheduled by the random access response using the transmission parameter; and control the transceiver to receive a contention resolution message using the transmission parameter.

In a seventh aspect, there is provided a network-side transmission point including: a receiving module configured to receive a random access request; a determining module configured to determine a transmission parameter for transmitting a random access response corresponding to the random access request; and a transmitting module configured to transmit the random access response using the transmission parameter.

In a possible implementation, the transmission parameter is preset, or the transmission parameter is determined by the network-side transmission point according to the random access request.

In a possible implementation, the determining module is configured to: determine an operating bandwidth corresponding to a preamble group including a preamble in the random access request according to a correspondence relationship between preamble groups and operating bandwidths, and determine the determined operating bandwidth as an operating bandwidth for transmitting the random access response; or determine a numerology corresponding to a preamble group including a preamble in the random access request according to a correspondence relationship between preamble groups and numerologies, and determine the determined numerologies as a numerology for transmitting the random access response.

In a possible implementation, the determining module is configured to: determine an operating bandwidth corresponding to a resource group including a transmission resource over which the random access request is received, according to a correspondence relationship between resource groups and operating bandwidths, and determine the determined operating bandwidth as an operating bandwidth for transmitting the random access response; or determine a numerology corresponding to a resource group including a transmission resource over which the random access request is received, according to a correspondence relationship between resource groups and numerologies, and determine the determined numerology as a numerology for transmitting the random access response.

In a possible implementation, the determining module is configured to: determine an operating bandwidth including a transmission resource over which the random access request is received, as an operating bandwidth for transmitting the random access response; or determine a numerology of an operating bandwidth including a transmission resource over which the random access request is received, as a numerology for transmitting the random access response; or determine a sub-frame type of a TTI including a transmission resource over which the random access request is received, and determine a numerology of the sub-frame type as a numerology for transmitting the random access response.

In a possible implementation, the receiving module is further configured to receive uplink transmission scheduled by the random access response using the transmission parameter; and the transmitting module is further configured to transmit a contention resolution message using the transmission parameter.

In an eighth aspect, there is provided another network-side transmission point including a processor, a transceiver, and a memory, where the processor is configured to read and execute programs in the memory to: receive a random access request through the transceiver; determine a transmission parameter for transmitting a random access response corresponding to the random access request; and control the transceiver to transmit the random access response using the transmission parameter; and the transceiver is configured to receive and transmit data under the control of the processor.

In a possible implementation, the transmission parameter is preset, or the transmission parameter is determined by the network-side transmission point according to the random access request.

In a possible implementation, the processor is configured to read and execute the programs in the memory to: determine an operating bandwidth corresponding to a preamble group including a preamble in the random access request according to a correspondence relationship between preamble groups and operating bandwidths, and determine the determined operating bandwidth as an operating bandwidth for transmitting the random access response; or determine a numerology corresponding to a preamble group including a preamble in the random access request according to a correspondence relationship between preamble groups and numerologies, and determine the determined numerology as a numerology for transmitting the random access response.

In a possible implementation, the processor is configured to read and execute the programs in the memory to: determine an operating bandwidth corresponding to a resource group including a transmission resource over which the random access request is received, according to a correspondence relationship between resource groups and operating bandwidths, and determine the determined operating bandwidth as an operating bandwidth for transmitting the random access response; or determine a numerology corresponding to a resource group including a transmission resource over which the random access request is received, according to a correspondence relationship between resource groups and numerologies, and determine the determined numerology as a numerology for transmitting the random access response.

In a possible implementation, the processor is configured to read and execute the programs in the memory to: determine an operating bandwidth including a transmission resource over which the random access request is received, as an operating bandwidth for transmitting the random access response; or determine a numerology of an operating bandwidth including a transmission resource over which the random access request is received, as a numerology for transmitting the random access response; or determine a sub-frame type of a TTI including a transmission resource over which the random access request is received, and determine a numerology of the sub-frame type as a numerology for transmitting the random access response.

In a possible implementation, the processor is further configured to read and execute the programs in the memory to: control the transceiver to receive uplink transmission scheduled by the random access response using the transmission parameter; and control the transceiver to transmit a contention resolution message using the transmission parameter.

In the methods and devices according to the embodiments of the invention, the terminal firstly determines its own transmission parameter for data transmission, and transmits the random access request according to the determined transmission parameter, so that the network-side transmission point transmits the random access response corresponding to the random access request using the operating bandwidth and/or the numerology used by the terminal, thus realizing a random access procedure in a 5G system, and improving an access success ratio. Moreover, since the network-side transmission point transmits the random access response corresponding to the random access request using the operating bandwidth and/or the numerology used by the terminal, the terminal can simply listen to and receive the random access response corresponding to the random access request using the transmission parameter, thus lowering the complexity of reception by the terminal.

DETAILED DESCRIPTION OF THE EMBODIMENTS

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

A terminal as referred to in the embodiments of the invention can also be referred to as a User Equipment (UE), a Mobile Station (MS), a Mobile Terminal (MS), an MTC terminal, etc., and the terminal can communicate with one or more core networks over a Radio Access Network (RAN).

A network-side transmission point as referred to in the embodiments of the invention can be an evolutional Node B (eNB or e-Node B), a macro eNB, a pico eNB (or a small eNB), a femto eNB, an Access Point (AP), a Transmission Point (TP), etc., in an LTE system, although the embodiments of the invention will not be limited thereto.

The embodiments of the invention will be described below in further details with reference to the drawings. It shall be appreciated that the embodiments to be described here are only intended to illustrate and explain the invention, but not to limit the invention thereto.

Figure 1A:
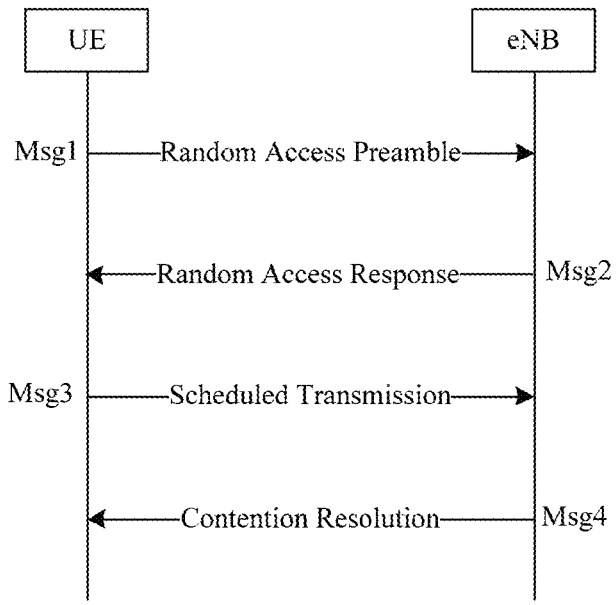
FIG. 1A is a schematic diagram of a non-contention random access.
Figure 1B:
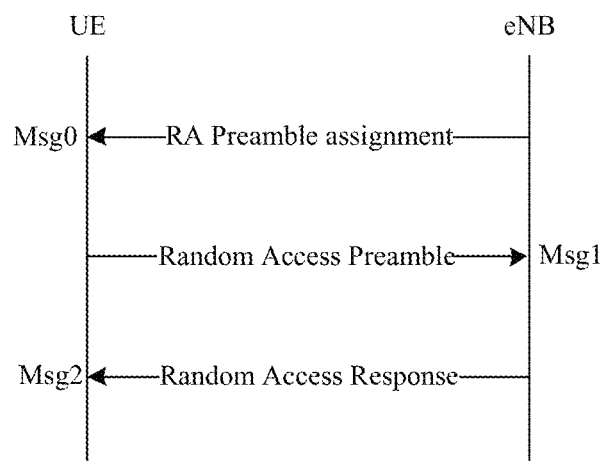
FIG. 1B is a schematic diagram of a contention random access.
Figure 2:
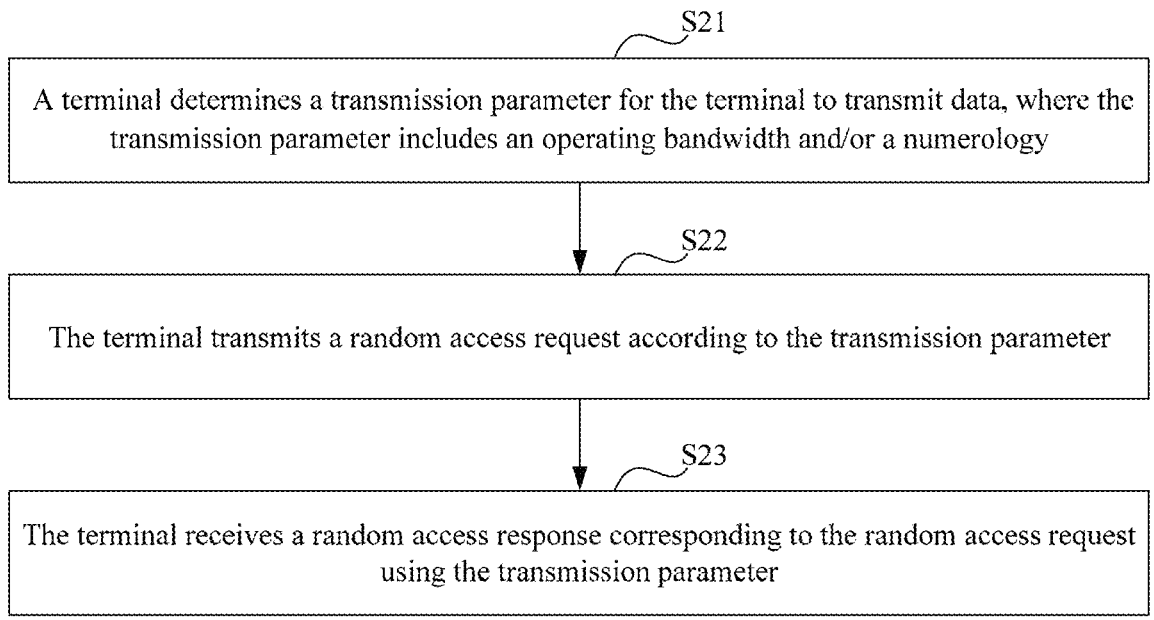
FIG. 2 is a schematic flow chart of a random access method at a terminal side according to an embodiment of the invention.

In an embodiment as illustrated in FIG. 2, there is provided a random access method at a terminal side, where the method includes the following operations.

In the operation S21, a terminal determines a transmission parameter for the terminal to transmit data, where the transmission parameter includes an operating bandwidth and/or a numerology.

Here the numerology includes at least one of a sub-carrier spacing, or a symbol length, etc.

In the operation S22, the terminal transmits a random access request, i.e., Msg1, according to the transmission parameter.

In the operation S23, the terminal receives a random access response corresponding to the random access request, i.e., Msg2, using the transmission parameter.

Particularly, the terminal listens to and receives the random access response corresponding to the random access request over its own operating bandwidth; and/or the terminal listens to and receives the random access response corresponding to the random access request over an operating bandwidth of the numerology of the terminal, or over a TTI with a sub-frame type of the numerology of the terminal.

In the embodiment of the invention, the terminal firstly determines its own transmission parameter for data transmission, and transmits the random access request according to the determined transmission parameter, so that the network-side transmission point transmits the random access response corresponding to the random access request using the operating bandwidth and/or the numerology used by the terminal, thus realizing a random access procedure in a 5G system, and improving an access success ratio. Moreover, since the network-side transmission point transmits the random access response corresponding to the random access request using the operating bandwidth and/or the numerology used by the terminal, the terminal can simply listen to and receive the random access response corresponding to the random access request using the transmission parameter, thus lowering the complexity of reception by the terminal.

In the embodiment of the invention, there are the following two possible implementations of the transmission parameter.

In an implementation A, the transmission parameter is preset.

Particularly, the operating bandwidth of the terminal is preset, and/or the numerology of the terminal is preset.

In this implementation, Msg1 and Msg2 are transmitted over a set operating bandwidth using a set numerology. For example, if the bandwidth of the network-side transmission point is narrow (that is, no larger than the operating bandwidth of the terminal), and there is only one kind of numerology, then the terminal will receive Msg2 throughout the operating bandwidth thereof, and at this time, Msg2 can be transmitted throughout the operating bandwidth of the network-side transmission point, where the set operating bandwidth can be the entire operating bandwidth of the network-side transmission point. In another example, if the bandwidth of the network-side transmission point is wide (that is, larger than the operating bandwidth of the terminal), then the terminal may not receive Msg2 over the operating bandwidth thereof, and at this time, Msg2 can only be transmitted over a part of the bandwidth of the network-side transmission point so that the terminal can receive Msg2, where the set operating bandwidth can be an operating bandwidth of a terminal with the lowest reception bandwidth capability so that all the terminals can receive Msg2. In still another example, if the network-side transmission point operates with a plurality of numerologies, then in order to enable all the terminals to receive Msg2, Msg2 can only be transmitted over a set operating bandwidth using a set numerology.

In an implementation B, the transmission parameter is determined by the terminal according to its own capability and/or traffic demand.

For example, for a terminal requiring a low latency, a numerology including a large sub-carrier spacing and a short symbol length is selected; and for general data communication, the terminal operate with a numerology including a normal sub-carrier spacing and a normal symbol length. For a terminal with a very low bandwidth capability, e.g., a low-cost terminal, the operating bandwidth is determined in the range of the capability thereof.

Further to any one of the embodiments above, the terminal further transmits the random access request according to the transmission parameter in the operation S22 in the following three possible schemes.

In a first scheme, a correspondence relationship between preamble groups and operating bandwidths, and/or a correspondence relationship between preamble groups and numerologies are/is created, that is, preambles are grouped and different preamble groups correspond to different operating bandwidths and/or numerologies.

Particularly, a correspondence relationship between preamble groups and operating bandwidths can be created, that is, a corresponding operating bandwidth can be determined based upon a preamble; or a correspondence relationship between preamble groups and numerologies can be created, that is, a corresponding numerology can be determined based upon a preamble; or a correspondence relationship between preamble groups, and operating bandwidths and numerologies can be created, that is, a corresponding operating bandwidth and a corresponding numerology can be determined based upon a preamble.

In a possible implementation, particularly in the operation S22: the terminal determines a preamble group corresponding to the operating bandwidth of the terminal according to a correspondence relationship between preamble groups and operating bandwidths; and the terminal selects a preamble from the determined preamble group as the random access request and transmits it.

Correspondingly, the network-side transmission point determines an operating bandwidth corresponding to the preamble group including the preamble in the random access request according to the correspondence relationship between preamble groups and operating bandwidths, and determines the determined operating bandwidth as an operating bandwidth for transmitting the random access response.

In this implementation, the correspondence relationship between preamble groups and operating bandwidths can be prescribed, or can be determined by the network-side transmission point and then notified to the terminal.

In another possible implementation, particularly in the operation S22: the terminal determines a preamble group corresponding to the numerology of the terminal according to a correspondence relationship between preamble groups and numerologies; and the terminal selects a preamble from the determined preamble group as the random access request and transmits it.

Correspondingly, the network-side transmission point determines a numerology corresponding to the preamble group including the preamble in the random access request according to the correspondence relationship between preamble groups and numerologies, and determines the determined numerology as a numerology for transmitting the random access response.

In this implementation, the correspondence relationship between preamble groups and numerologies can be prescribed, or can be determined by the network-side transmission point and then notified to the terminal.

In a second scheme, a correspondence relationship between resource groups and operating bandwidths, and/or a correspondence relationship between resource groups and numerologies are/is created, that is, transmission resources for transmitting Msg1, e.g., Physical Random Access Channel (PRACH) resources are grouped, and different resource groups correspond to different operating bandwidths and/or numerologies.

Particularly, a correspondence relationship between resource groups and operating bandwidths can be created, that is, a corresponding operating bandwidth can be determined based upon a transmission resource for transmitting Msg1; or a correspondence relationship between resource groups and numerologies can be created, that is, a corresponding numerology can be determined based upon a transmission resource for transmitting Msg1; or a correspondence relationship between resource groups, and operating bandwidths and numerologies can be created, that is, a corresponding operating bandwidth and a corresponding numerology can be determined based upon a transmission resource for transmitting Msg1.

In a possible implementation, particularly in the operation S22: the terminal determines a resource group corresponding to the operating bandwidth of the terminal based upon a correspondence relationship between resource groups and operating bandwidths; and the terminal transmits the random access request over a transmission resource in the determined resource group.

Correspondingly, the network-side transmission point determines an operating bandwidth corresponding to the resource group including the transmission resource over which the random access request is received, according to the correspondence relationship between resource groups and operating bandwidths, and determines the determined operating bandwidth as an operating bandwidth for transmitting the random access response.

In this implementation, the correspondence relationship between resource groups and operating bandwidths can be prescribed, or can be determined by the network-side transmission point and then notified to the terminal.

In another possible implementation, particularly in the operation S22: the terminal determines a resource group corresponding to the numerology of the terminal based upon a correspondence relationship between resource groups and numerologies; and the terminal transmits the random access request over a transmission resource in the determined resource group.

Correspondingly, the network-side transmission point determines a numerology corresponding to the resource group including the transmission resource over which the random access request is received, according to the correspondence relationship between resource groups and numerologies, and determines the determined numerology as a numerology for transmitting the random access response.

In this implementation, the correspondence relationship between resource groups and operating bandwidths can be prescribed, or can be determined by the network-side transmission point and then notified to the terminal.

In a third scheme, transmission resources of Msg1 are configured over respective operating bandwidths, and/or transmission resources of Msg1 are configured over operating bandwidths or sub-frame types with different numerologies.

In a possible implementation, particularly in the operation S22, the terminal transmits the random access request over a transmission resource in the operating bandwidth of the UE.

Correspondingly, the network-side transmission point determines an operating bandwidth including the transmission resource over which the random access request is received, as an operating bandwidth for transmitting the random access response.

In another possible implementation, particularly in the operation S22, the terminal transmits the random access request over a transmission resource in an operating bandwidth of the numerology of the UE.

Correspondingly, the network-side transmission point determines a numerology of an operating bandwidth including the transmission resource over which the random access request is received, as a numerology for transmitting the random access response.

In still another implementation, particularly in the operation S22, the terminal transmits the random access request over a transmission resource in a Transmission Time Interval (TTI) with a sub-frame type of the numerology of the terminal.

The network-side transmission point determines a sub-frame type of a TTI including the transmission resource over which the random access request is received, and determines a numerology of the sub-frame type as a numerology for transmitting the random access response.

The schemes above can be applied separately or in combination, although the embodiment of the invention will not be limited thereto. For example, the terminal determines a preamble group corresponding to the operating bandwidth of the terminal according to a correspondence relationship between preamble groups and operating bandwidths, selects a preamble from the determined preamble group, and transmits it as the random access request in the implementation B1, determines a resource group corresponding to the numerology of the terminal according to a correspondence relationship between resource groups and numerologies, and transmits the random access request over a transmission resource in the determined resource group as in the implementation B2, etc.

Further to any one of the embodiments above, if there is a subsequent random access procedure, e.g., Msg3 and Msg4 in a contention random access procedure, then the method will further include: the terminal transmits uplink transmission scheduled by the random access response, i.e., Msg3, using the transmission parameter; and the terminal receives a contention resolution message, i.e., Msg4, using the transmission parameter.

Figure 3:
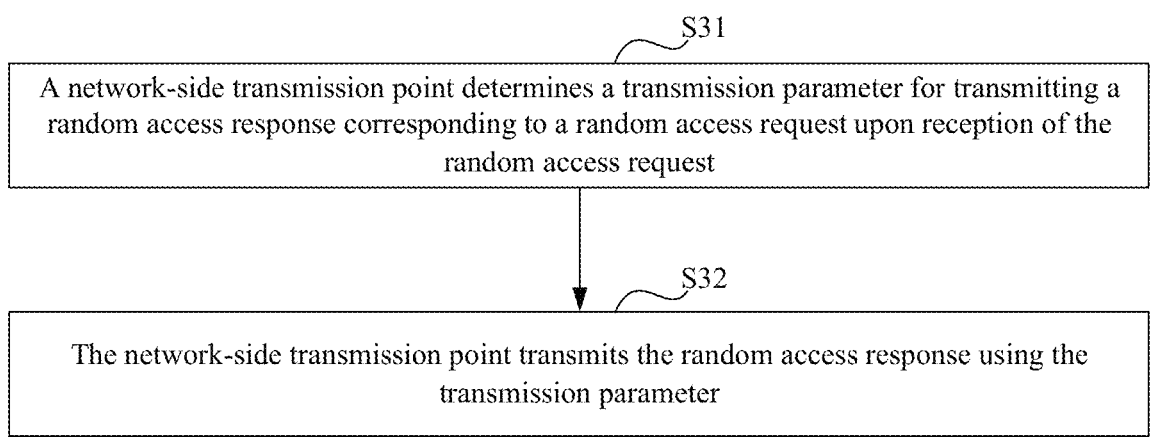
FIG. 3 is a schematic flow chart of a random access method at a network side according to an embodiment of the invention.

In an embodiment as illustrated in FIG. 3, there is provided a random access method at a network side, where the method includes the following operations.

In the operation S31, a network-side transmission point determines a transmission parameter for transmitting a random access response corresponding to a random access request upon reception of the random access request.

In the operation S32, the network-side transmission point transmits the random access response using the transmission parameter.

In the embodiment of the invention, the network-side transmission point determines the transmission parameter, i.e. an operating bandwidth and/or a numerology of a terminal, for transmitting the random access response corresponding to the random access request upon reception of the random access request, and transmits the random access response using the transmission parameter, thus realizing a random access procedure in a 5G system, and improving an access success ratio. Moreover, since the network-side transmission point transmits the random access response corresponding to the random access request using the operating bandwidth and/or the numerology used by the terminal, the terminal can simply listen to and receive the random access response corresponding to the random access request using the transmission parameter, thus lowering the complexity of reception by the terminal.

In the embodiment of the invention, the transmission parameter is preset, or the transmission parameter is determined by the network-side transmission point according to the random access request.

In a possible implementation, the network-side transmission point determines the transmission parameter for transmitting the random access response corresponding to the random access request as follows.

The network-side transmission point determines an operating bandwidth corresponding to a preamble group including a preamble in the random access request according to a correspondence relationship between preamble groups and operating bandwidths, and determines the determined operating bandwidth as an operating bandwidth for transmitting the random access response; or the network-side transmission point determines a numerology corresponding to a preamble group including a preamble in the random access request according to a correspondence relationship between preamble groups and numerologies, and determines the determined numerology as a numerology for transmitting the random access response.

In another possible implementation, the network-side transmission point determines the transmission parameter for transmitting the random access response corresponding to the random access request as follows.

The network-side transmission point determines an operating bandwidth corresponding to a resource group including a transmission resource over which the random access request is received, according to a correspondence relationship between resource groups and operating bandwidths, and determines the determined operating bandwidth as an operating bandwidth for transmitting the random access response; or the network-side transmission point determines a numerology corresponding to a resource group including a transmission resource over which the random access request is received, according to a correspondence relationship between resource groups and numerologies, and determines the determined numerology as a numerology for transmitting the random access response.

In still another implementation, the network-side transmission point determines the transmission parameter for transmitting the random access response corresponding to the random access request as follows.

The network-side transmission point determines an operating bandwidth including a transmission resource over which the random access request is received, as an operating bandwidth for transmitting the random access response; or the network-side transmission point determines a numerology of an operating bandwidth including a transmission resource over which the random access request is received, as a numerology for transmitting the random access response; or the network-side transmission point determines a sub-frame type of a TTI including a transmission resource over which the random access request is received, and determines a numerology of the sub-frame type as a numerology for transmitting the random access response.

Further to any one of the embodiments above, the method further includes: the network-side transmission point receives uplink transmission scheduled by the random access response using the transmission parameter; and the network-side transmission point transmits a contention resolution message using the transmission parameter.

A random access procedure according to an embodiment of the invention will be described below in details in connection with seven particular embodiments thereof.

First Embodiment: in this embodiment, a random access procedure is performed over a set operating bandwidth and using a set numerology.

In this embodiment, all the terminals perform a random access procedure including at least Msg1 and Msg2 over a commonly available resource (i.e., a transmission resource in the set operating bandwidth) and using the same numerology (the set numerology).

Figure 4A:
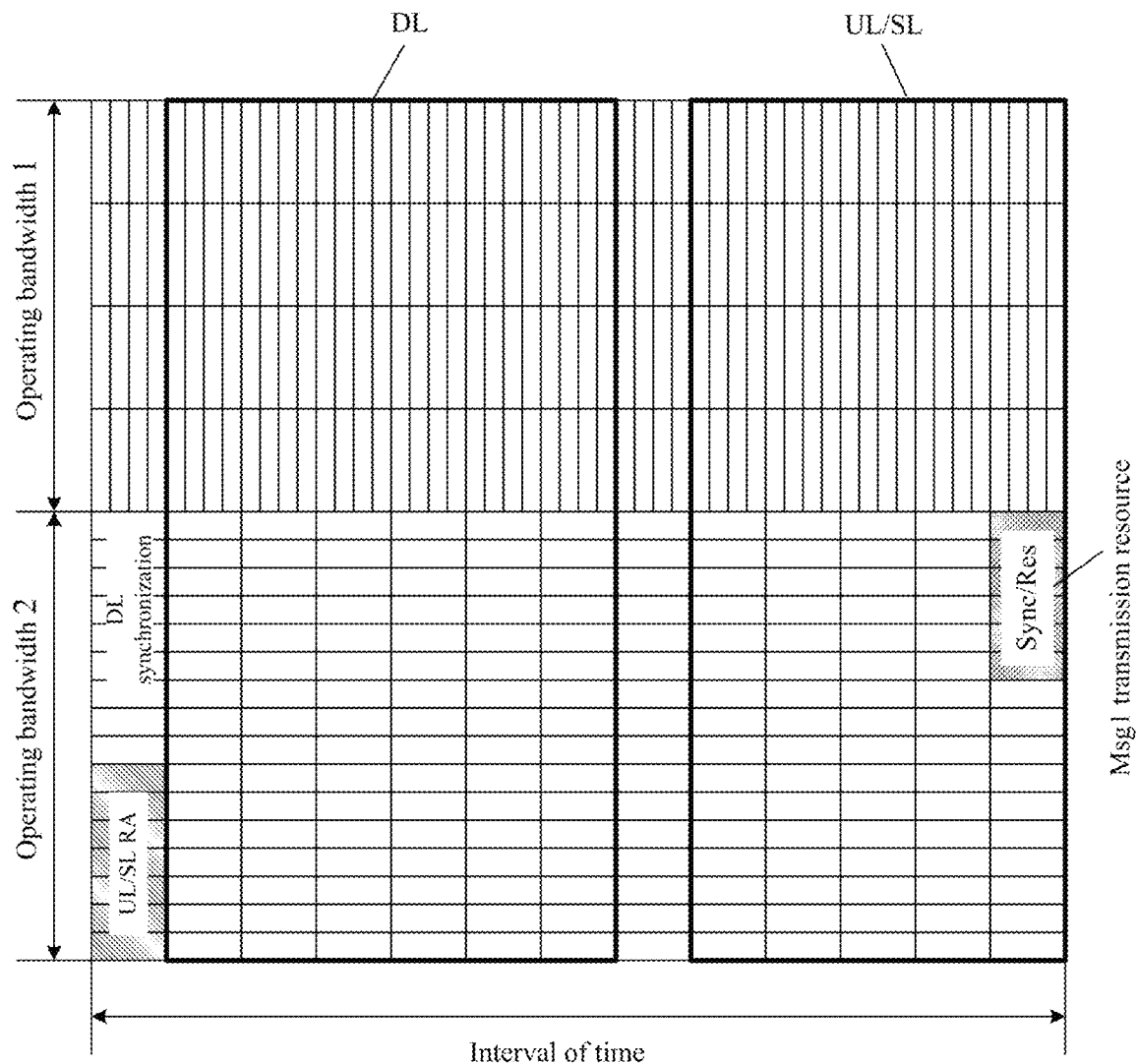
FIG. 4A is a schematic diagram of a random access procedure according to a first embodiment of the invention.

In FIG. 4A, for example, both Msg1 and Msg2 in the random access procedure are transmitted over an operating bandwidth 2, and Msg2 is transmitted using a numerology of the operating bandwidth 2.

Figure 4B:
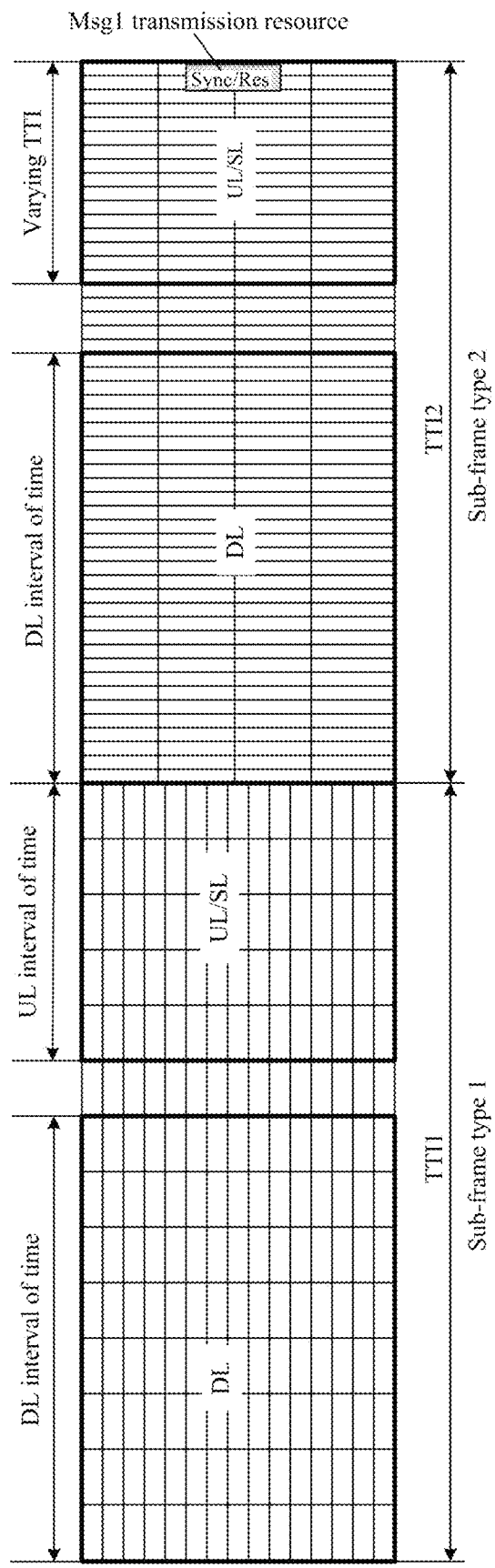
FIG. 4B is a schematic diagram of another random access procedure according to the first embodiment of the invention.

In FIG. 4B, in another example, both Msg1 and Msg2 in the random access procedure are transmitted in a TTI of a sub-frame type 1, and Msg2 is transmitted using a numerology of the sub-frame type 1.

In this embodiment, if there is a subsequent random access procedure (e.g., Msg3 and Msg4), then all the subsequent random access procedure will be scheduled and transmitted by a network-side transmission point in the following two schemes.

In a scheme 1, if the network-side transmission point can determine an operating bandwidth and/or a numerology for subsequent data transmission by a terminal, then the subsequent random access messages will be transmitted using the determined operating bandwidth and/or numerology.

In a scheme 2, the messages in the subsequent random access procedure are only transmitted over the operating bandwidth for transmitting Msg1 and Msg2, and/or using the same numerology as the numerology for transmitting Msg2.

Second Embodiment: in this embodiment, different random access request sequence groups (i.e., preamble groups) correspond to different operating bandwidths.

Figure 5:
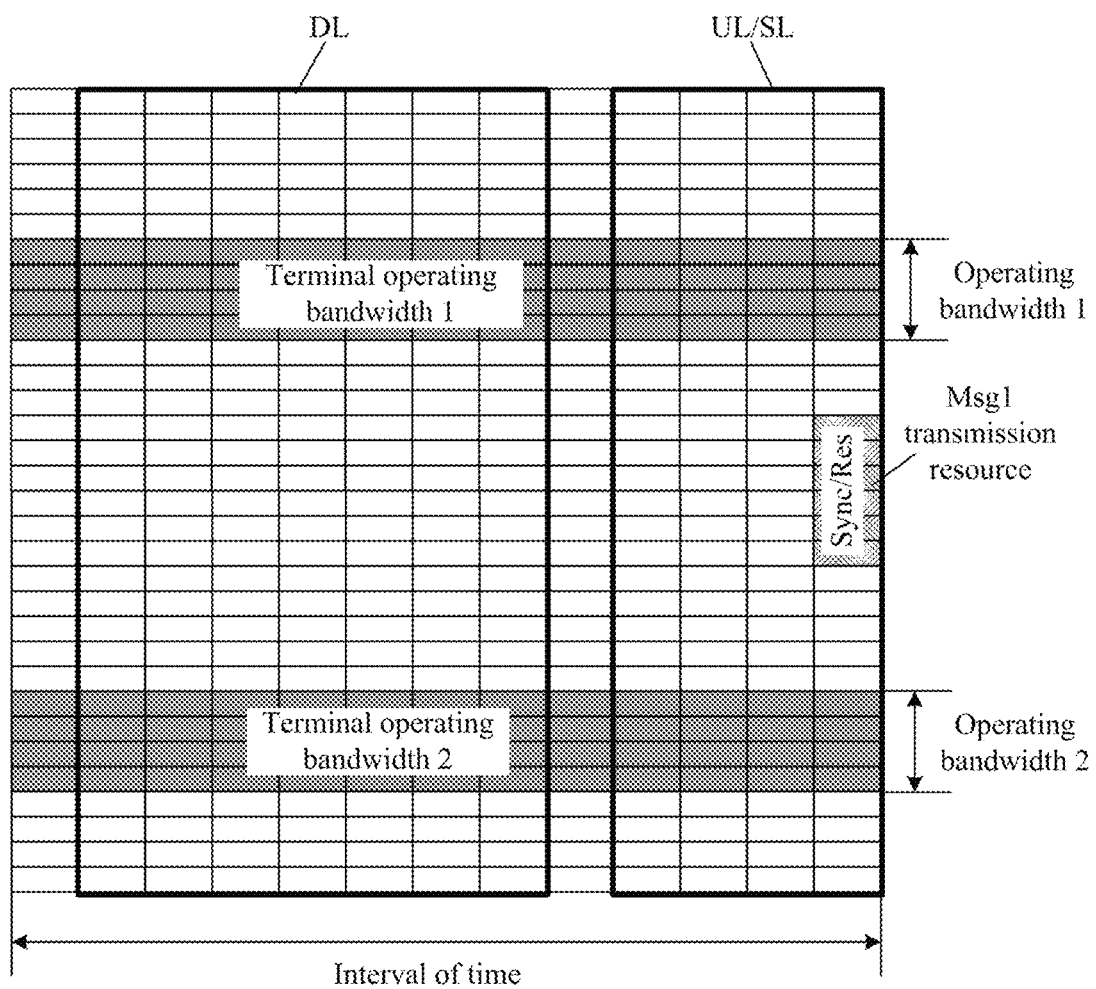
FIG. 5 is a schematic diagram of a random access procedure according to a second embodiment of the invention.

In this embodiment, a transmission resource of Msg1 is available to all the terminals regardless of whatever capabilities of the terminals, and whichever operating bandwidths and/or numerologies to be possibly applied to subsequent data transmission, but a preamble group corresponds to an operating bandwidth of Msg2; and as illustrated in FIG. 5, a preamble group 1 corresponds to an operating bandwidth 1, and a preamble group 2 corresponds to an operating bandwidth 2.

In this embodiment, a terminal selects a preamble from a corresponding preamble group according to an operating bandwidth over which Msg2 is to be subsequently received, and transmits it as Msg1. As illustrated in FIG. 5, for example, if the terminal subsequently operates over the operating bandwidth 1, then it will select a preamble from the preamble group 1, and transmit it as Msg1; and the network-side transmission point will transmit Msg2 over the operating bandwidth 1 upon reception of Msg1.

If there is a subsequent random access procedure, e.g., Msg3 and Msg4, then the messages in the subsequent random access procedure will be scheduled and transmitted over the operating bandwidth for transmitting Msg2.

Third Embodiment: in this embodiment, different random access request sequence groups (i.e., preamble groups) correspond to different numerologies.

In this embodiment, a transmission resource of Msg1 is available to all the terminals regardless of whatever capabilities of the terminals, and whichever operating bandwidths and/or numerologies to be possibly applied to subsequent data transmission, but a preamble group corresponds to a numerology of Msg2.

As illustrated in FIG. 4A, for example, a preamble group 1 corresponds to an operating bandwidth 1 and its numerology, and a preamble group 2 corresponds to an operating bandwidth 2 and its numerology. If the terminal selects a preamble from the preamble group 1 and transmits it as Msg1, then the network-side transmission point will transmit Msg2 over the operating bandwidth 1 and using the numerology of the operating bandwidth 1.

As illustrated in FIG. 4B, in another example, a preamble group 1 corresponds to a TTI of a sub-frame type 1, and a preamble group 2 corresponds to a TTI of a sub-frame type 2. If the terminal selects a preamble from the preamble group 1 and transmits it as Msg1, then the network-side transmission point will transmit Msg2 using the TTI of the sub-frame type 1 and the numerology of the sub-frame type 1.

If there are messages in subsequent random access procedure, e.g., Msg3 and Msg4, then the messages in the subsequent random access procedure will be scheduled and transmitted over an operating bandwidth for transmitting Msg2 and/or the same sub-frame type as Msg2, and using the same numerology as Msg2.

Fourth Embodiment: in this embodiment, different combinations of random access request sequence groups (i.e., preamble groups), and transmission resources for transmitting Msg1 correspond to different operating bandwidths.

In this embodiment, an Msg1 transmission resource (i.e., a transmission resource for transmitting Msg1) is available to all the terminals regardless of whatever capabilities of the terminals, and whichever operating bandwidths and/or numerologies to be possibly applied to subsequent data transmission, but a network-side transmission point determines a correspondence relationship between combinations of preamble groups and Msg1 transmission resources, and Msg2 operating bandwidths, in advance in a system message or according to a pre-configuration of a terminal.

Figure 6:
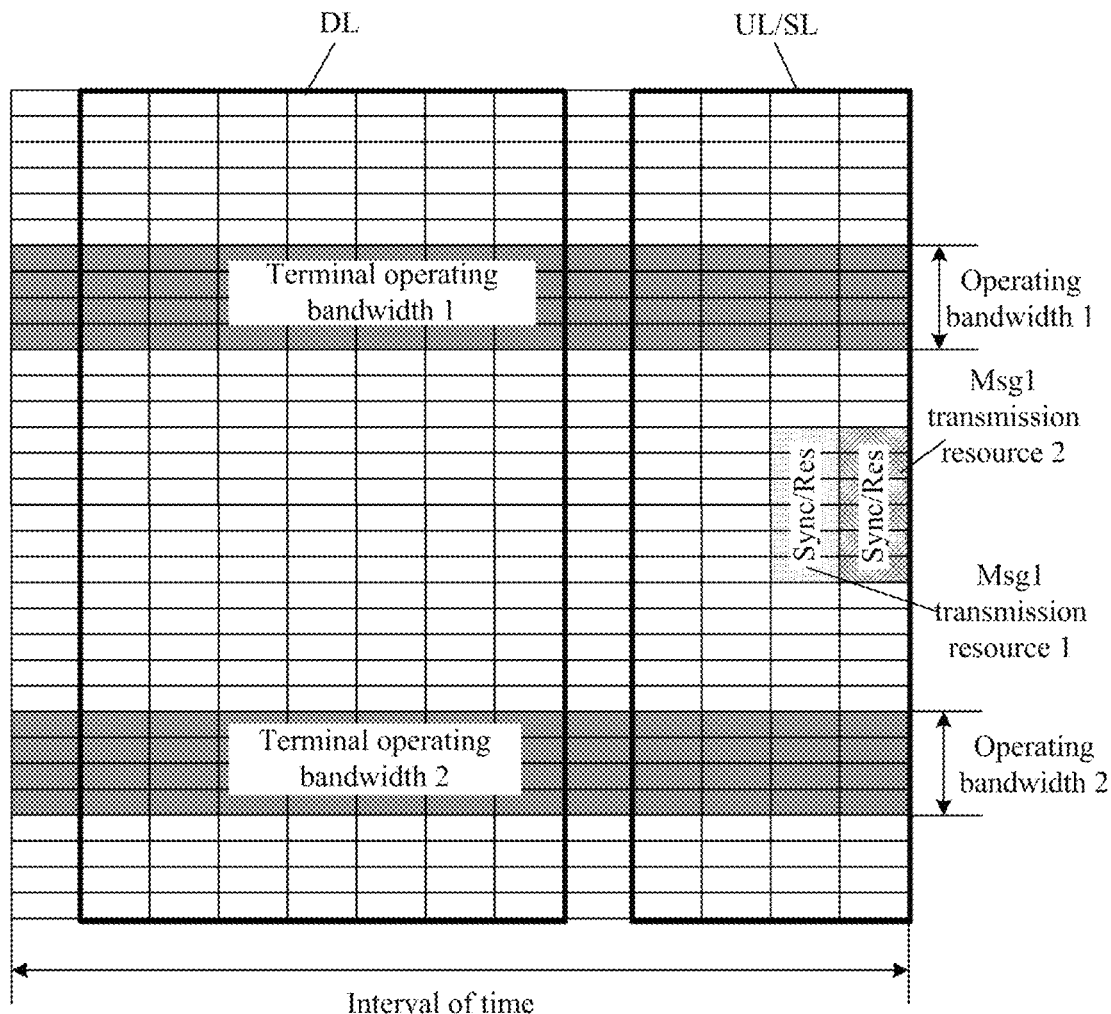
FIG. 6 is a schematic diagram of a random access procedure according to a fourth embodiment of the invention.

As illustrated in FIG. 6, for example, it can be specified that Msg2 corresponding to any preamble transmitted over an Msg1 transmission resource 1 be transmitted over an operating bandwidth 1, and Msg2 corresponding to any preamble transmitted over an Msg1 transmission resource 2 be transmitted over an operating bandwidth 2. Preamble groups which can be transmitted over the Msg1 transmission resource 1 and the Msg1 transmission resource 2 can be further distinguished from each other.

Correspondingly, when the terminal transmits an available preamble over the Msg1 transmission resource 1, the network-side transmission point transmits Msg2 over the operating bandwidth 1 to respond to a random access request of the terminal. The terminal can simply listen to and receive Msg2 over the operating bandwidth 1 after transmitting Msg1.

If there are messages in a subsequent random access procedure, e.g., Msg3 and Msg4, then the messages in the subsequent random access procedure will be scheduled and transmitted over an operating bandwidth for transmitting Msg2.

Fifth Embodiment: in this embodiment, different combinations of random access request sequence groups (i.e., preamble groups), and transmission resources for transmitting Msg1 correspond to different numerologies.

In this embodiment, an Msg1 transmission resource (i.e., a transmission resource for transmitting Msg1) is available to all the terminals regardless of whatever capabilities of the terminals, and whichever operating bandwidths and/or numerologies to be possibly applied to subsequent data transmission, but a network-side transmission point determines a correspondence relationship between combinations of preamble groups and Msg1 transmission resources, and numerologies of Msg2, in advance in a system message or according to a pre-configuration of a terminal.

Figure 7:
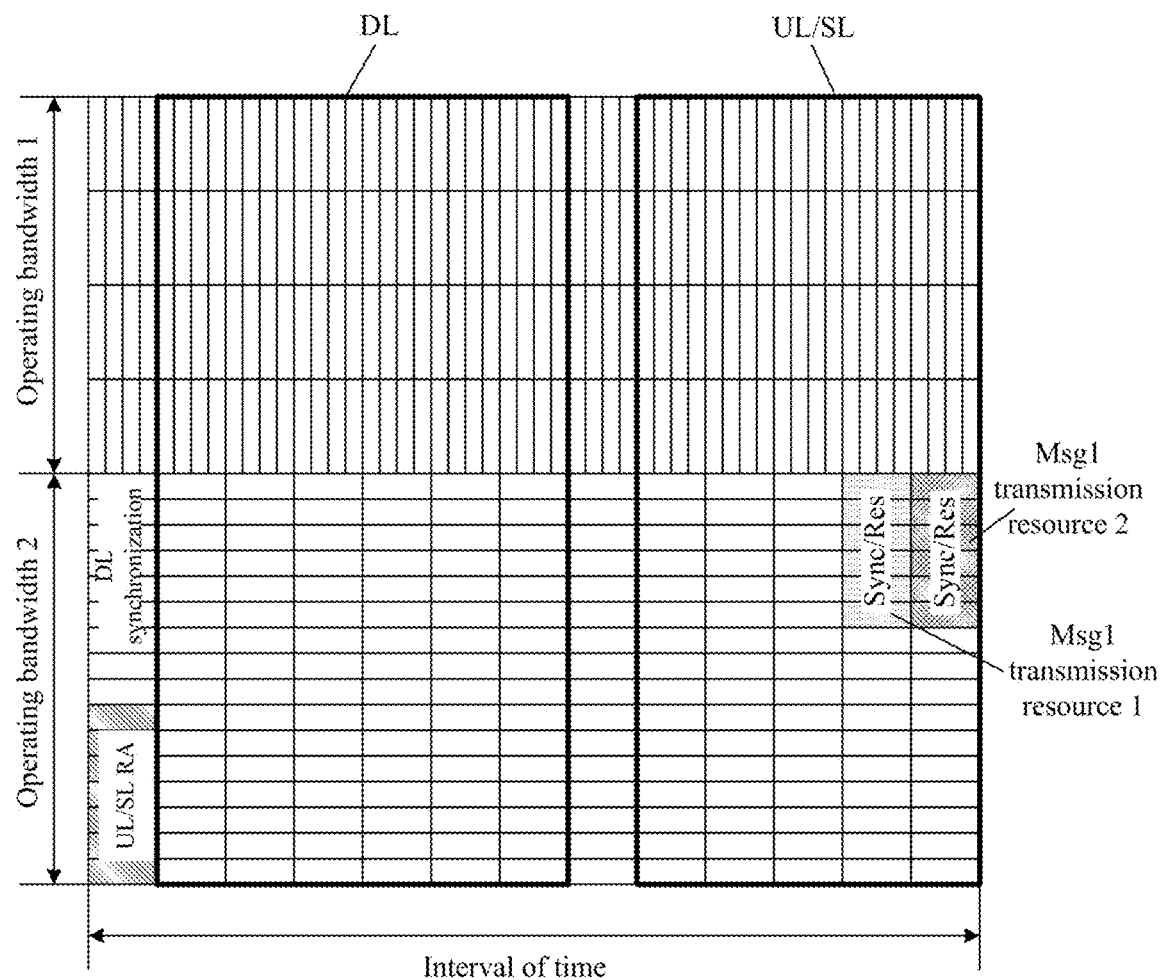
FIG. 7 is a schematic diagram of a random access procedure according to a fifth embodiment of the invention.

As illustrated in FIG. 7, for example, it can be specified that Msg2 corresponding to any preamble transmitted over an Msg1 transmission resource 1 be transmitted over an operating bandwidth 1 using a numerology of the operating bandwidth 1, and Msg2 corresponding to any preamble transmitted over an Msg1 transmission resource 2 be transmitted over an operating bandwidth 2 using a numerology of the operating bandwidth 2. Preamble groups which can be transmitted over the Msg1 transmission resource 1 and the Msg1 transmission resource 2 can be further distinguished from each other.

Correspondingly, when the terminal transmits an available preamble over the Msg1 transmission resource 1, the network-side transmission point transmits Msg2 over the operating bandwidth 1 using the numerology of the operating bandwidth 1, to respond to a random access request of the terminal. The terminal can simply listen to and receive Msg2 over the operating bandwidth 1 using the numerology of the operating bandwidth 1 after transmitting Msg1.

If there are messages in a subsequent random access procedure, e.g., Msg3 and Msg4, then the messages in the subsequent random access procedure will be scheduled and transmitted over an operating bandwidth for transmitting Msg2 using the same numerology as Msg2.

Figure 8:
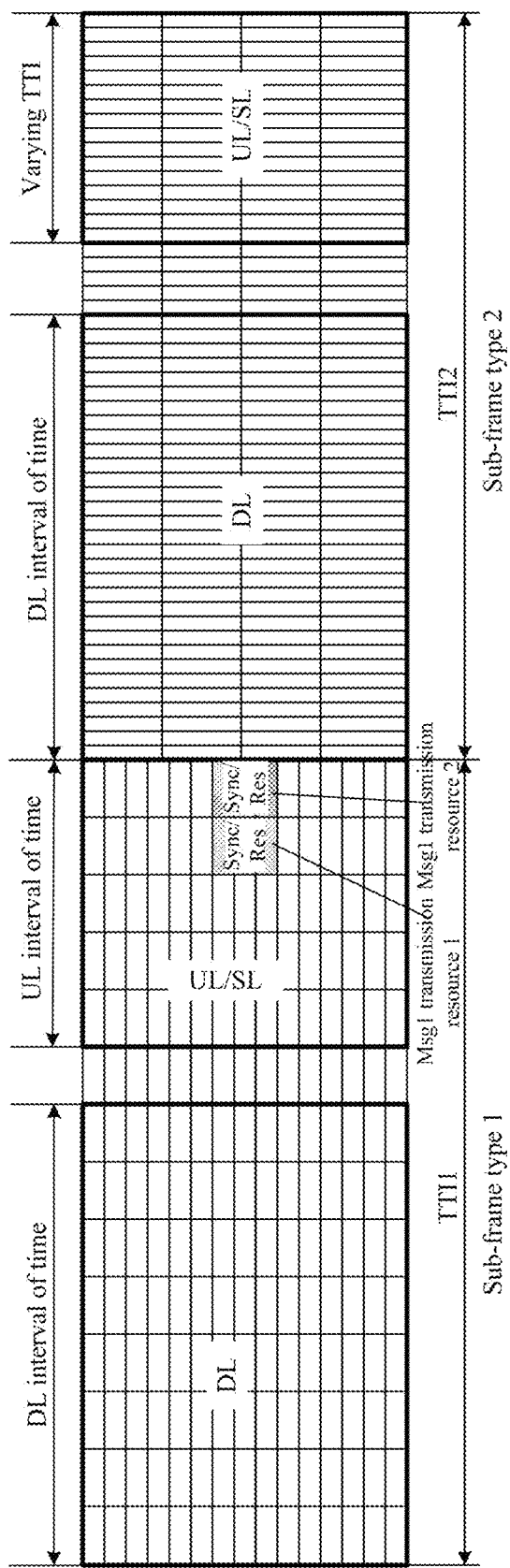
FIG. 8 is a schematic diagram of another random access procedure according to the fifth embodiment of the invention.

As illustrated in FIG. 8, in another example, it can be specified that Msg2 corresponding to any preamble transmitted over an Msg1 transmission resource 1 be transmitted in a TTI of a sub-frame type 1 using a numerology of the sub-frame type 1, and Msg2 corresponding to any preamble transmitted over an Msg1 transmission resource 2 be transmitted in a TTI of a sub-frame type 2 using a numerology of the sub-frame type 2. Preamble groups which can be transmitted over the Msg1 transmission resource 1 and the Msg1 transmission resource 2 can be further distinguished from each other.

Correspondingly, when the terminal transmits an available preamble over the Msg1 transmission resource 1, the network-side transmission point transmits Msg2 in the TTI of the sub-frame type 1 using the numerology of the sub-frame type 1, to respond to a random access request of the terminal. The terminal can simply listen to and receive Msg2 in the TTI of the sub-frame type 1 using the numerology of the sub-frame type 1 after transmitting Msg1.

If there are messages in a subsequent random access procedure, e.g., Msg3 and Msg4, then the messages in the subsequent random access procedure will be scheduled and transmitted in a TTI of the same sub-frame type as Msg2 using the same numerology as Msg2.

Sixth Embodiment: in this embodiment, Msg1 is transmitted over an operating bandwidth corresponding to Msg2.

In this embodiment, Msg1 transmission resources (i.e., transmission resources for transmitting Msg1) are configured over respective operating bandwidths. A terminal to operate over a specific operating bandwidth can transmit Msg1 over a transmission resource, for transmitting Msg1, in the specific operating bandwidth, and simply receive Msg2 over the specific operating bandwidth. If there is a subsequent random access message, then the message will also be scheduled and transmitted over the operating bandwidth of Msg1 and Msg2.

Figure 9:
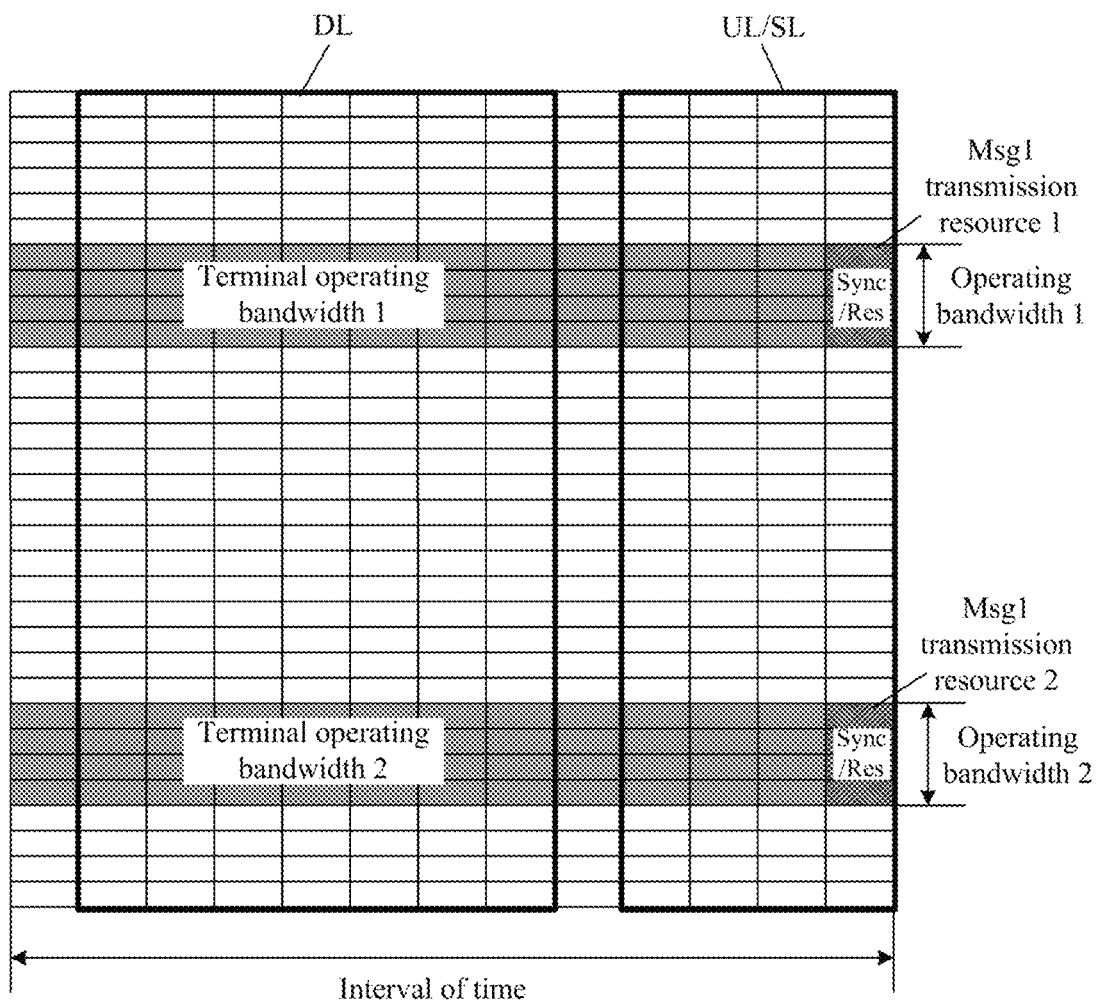
FIG. 9 is a schematic diagram of a random access procedure according to a sixth embodiment of the invention.

As illustrated in FIG. 9, for example, if the terminal is to operate over an operating bandwidth 1, then the terminal will select a transmission resource over the operating bandwidth 1 and transmit Msg1 over the transmission resource, and simply listen to and receive Msg2 over the operating bandwidth 1. If there is a subsequent random access message, then the message will also be scheduled and transmitted over the operating bandwidth 1.

Seventh Embodiment: in this embodiment, Msg1 is transmitted over an operating bandwidth or a sub-frame type with a numerology required by Msg2.

In this embodiment, Msg1 transmission resources (i.e., transmission resources for transmitting Msg1) are configured over operating bandwidths of different numerologies, or sub-frame types with different numerologies. A terminal to operate with a specific numerology can transmit Msg1 over an operating bandwidth of the specific numerology, or a sub-frame type with the specific numerology, and simply receive Msg2 over the operating bandwidth of the specific numerology, or the sub-frame type with the specific numerology. If there is a subsequent random access message, then the message will also be scheduled and transmitted over the operating bandwidth for transmitting Msg1 and Msg2, or a sub-frame type with the same numerology.

Figure 10:
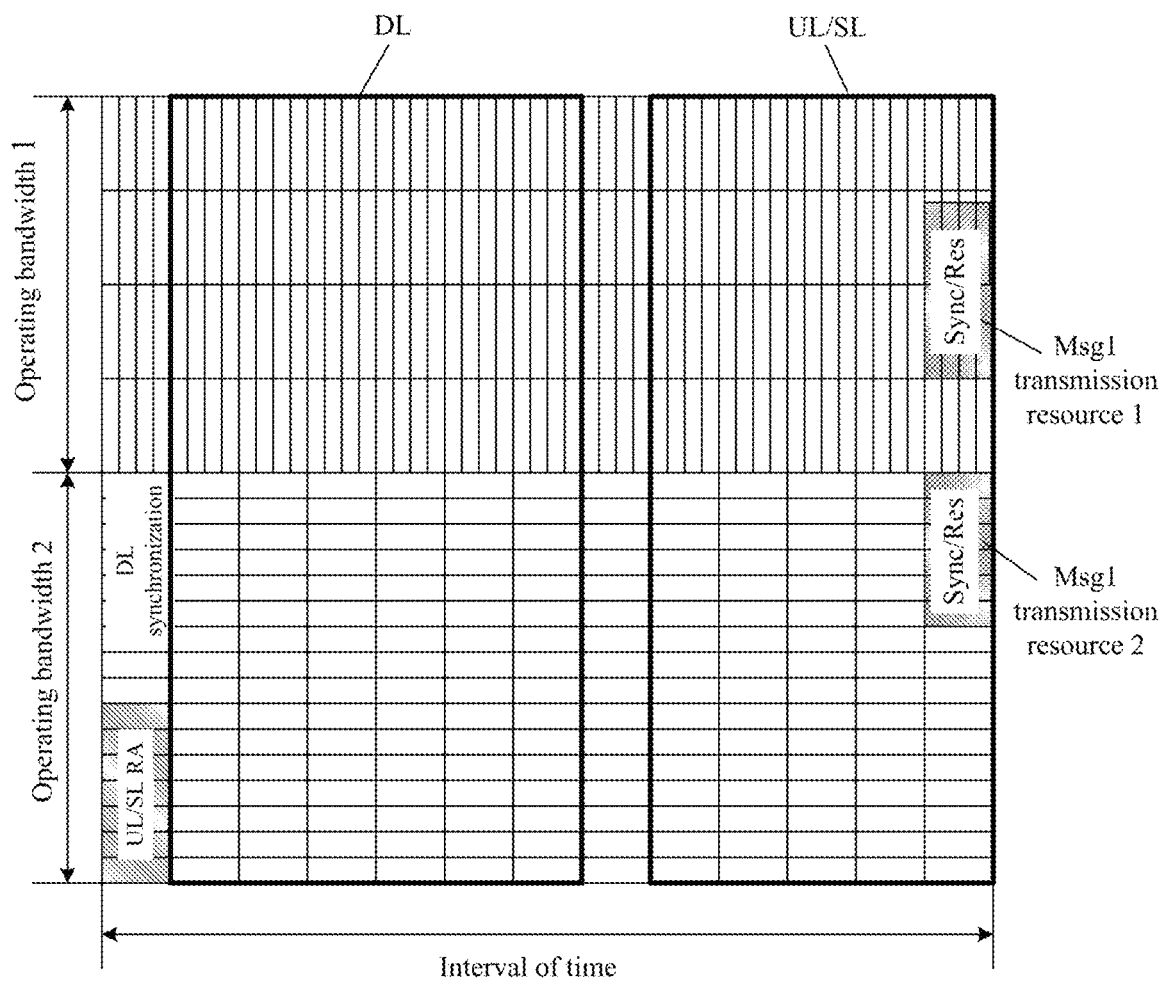
FIG. 10 is a schematic diagram of a random access procedure according to a seventh embodiment of the invention.

As illustrated in FIG. 10, for example, if a terminal is to operate with a numerology of an operating bandwidth 1, then the terminal will transmit Msg1 over a transmission resource in the operating bandwidth 1, and simply listen to and receive Msg2 over the operating bandwidth 1 using the numerology of the operating bandwidth 1. If there is a subsequent random access message, then the message will also be scheduled and transmitted over the operating bandwidth 1 using the numerology of the operating bandwidth 1.

Figure 11:
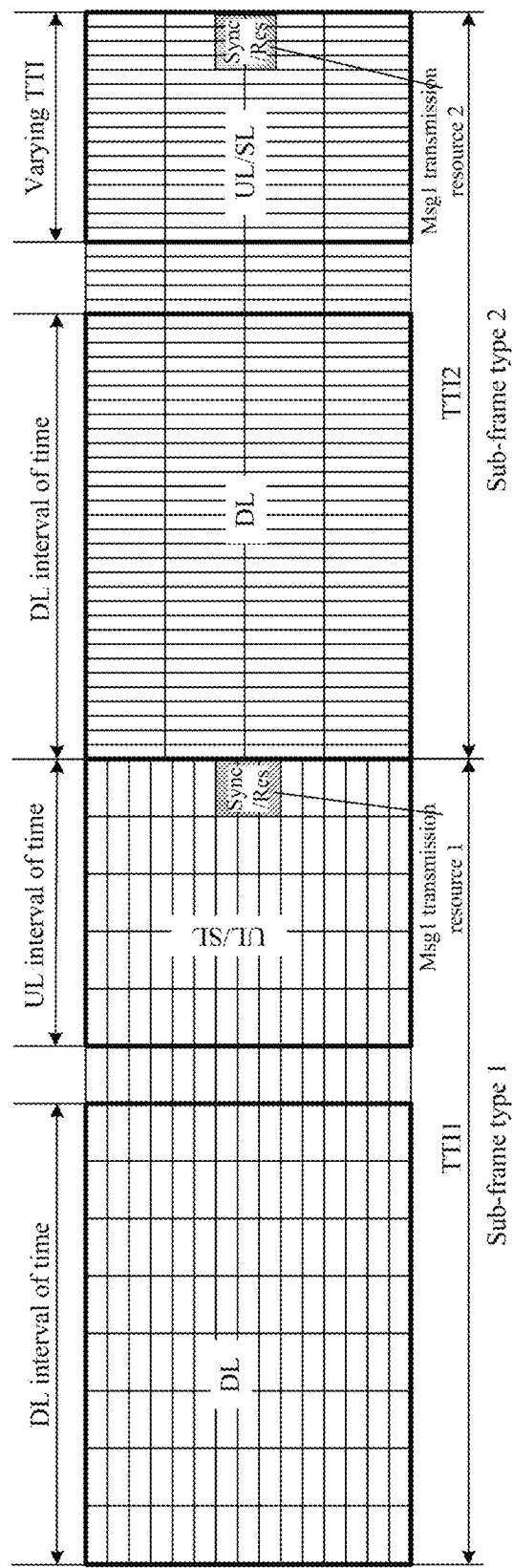
FIG. 11 is a schematic diagram of another random access procedure according to the seventh embodiment of the invention.

As illustrated in FIG. 11, in another example, if the terminal is to operate with a numerology of a sub-frame type 1, then the terminal will transmit Msg1 over a transmission resource in a TTI of the sub-frame type 1 (e.g., an Msg1 transmission resource 1 as illustrated in FIG. 11), and simply listen to and receive Msg2 in the TTI of the sub-frame type 1 using the numerology corresponding to the sub-frame type 1. If there is subsequently another random access message, then the message will also be scheduled and transmitted in the TTI of the sub-frame type 1 using the numerology corresponding to the sub-frame type 1.

The processing flows of the methods above can be performed in software programs, the software programs can be stored in a storage medium, and when the stored software programs are invoked, they can perform the operations in the methods above.

Based upon the same inventive idea, an embodiment of the invention further provides a terminal, and since the terminal addresses the problem under a similar principle to the random access method as illustrated in FIG. 2, reference can be made to the implementation of the method for an implementation of the terminal, and a repeated description thereof will be omitted here.

Figure 12:
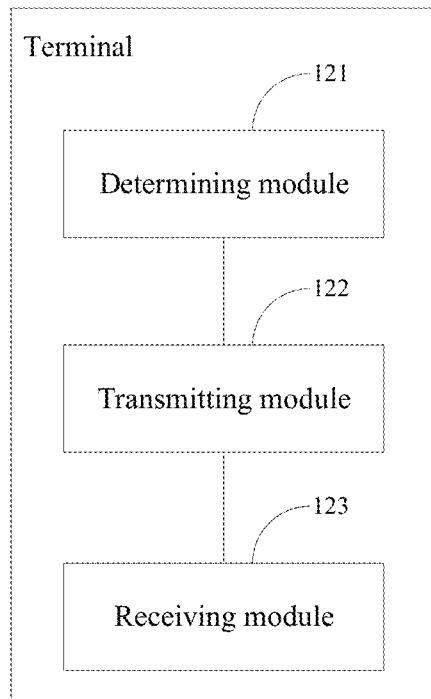
FIG. 12 is a schematic diagram of a terminal according to an embodiment of the invention.

In an embodiment as illustrated in FIG. 12, there is provided a terminal including: a determining module 121 configured to determine a transmission parameter for the terminal to transmit data, where the transmission parameter includes an operating bandwidth and/or a numerology; a transmitting module 122 configured to transmit a random access request according to the transmission parameter; and a receiving module 123 configured to receive a random access response corresponding to the random access request using the transmission parameter.

In a possible implementation, the transmission parameter is preset, or the transmission parameter is determined by the terminal according to its own capability and/or traffic demand.

In a possible implementation, the transmitting module is configured to: determine a preamble group corresponding to the operating bandwidth of the terminal according to a correspondence relationship between preamble groups and operating bandwidths, or determine a preamble group corresponding to the numerology of the terminal according to a correspondence relationship between preamble groups and numerologies; and select a preamble from the determined preamble group, and transmit it as the random access request.

In a possible implementation, the transmitting module is configured to: determine a resource group corresponding to the operating bandwidth of the terminal according to a correspondence relationship between resource groups and operating bandwidths, or determine a resource group corresponding to the numerology of the terminal according to a correspondence relationship between resource groups and numerologies; and transmit the random access request over a transmission resource in the determined resource group.

In a possible implementation, the transmitting module is configured to: transmit the random access request over a transmission resource in the operating bandwidth of the terminal; or transmit the random access request over a transmission resource in an operating bandwidth of the numerology of the terminal, or a transmission resource in a Transmission Time Interval (TTI) with a sub-frame type of the numerology of the terminal.

In a possible implementation, the transmitting module is further configured to transmit uplink transmission scheduled by the random access response using the transmission parameter; and the receiving module is further configured to receive a contention resolution message using the transmission parameter.

Figure 13:
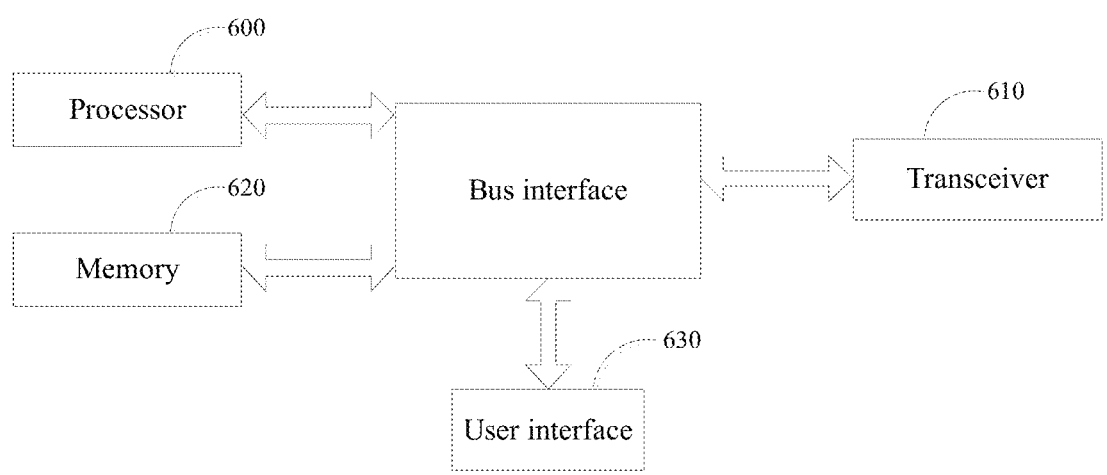
FIG. 13 is a schematic diagram of another terminal according to an embodiment of the invention.

In an embodiment as illustrated in FIG. 13, there is provided another terminal including a processor 600, a transceiver 610, and a memory 620, where the processor 600 is configured to read and execute programs in the memory 620 to: determine a transmission parameter for the terminal to transmit data, where the transmission parameter includes an operating bandwidth and/or a numerology; transmit a random access request according to the transmission parameter through the transceiver; and control the transceiver to receive a random access response corresponding to the random access request using the transmission parameter; and the transceiver 610 is configured to receive and transmit data under the control of the processor 600.

Here in FIG. 13, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices over a transmission medium. For different user equipment, the user interface 630 can also be an interface via which devices are connected internally and externally as needed, and the connected devices include but will not be limited to a keypad, a monitor, a speaker, a microphone, a joystick, etc.

The processor 600 is responsible for managing the bus architecture and performing normal processes, and the memory 620 can store data for use by the processor 600 in performing the operations.

In a possible implementation, the transmission parameter is preset, or the transmission parameter is determined by the terminal according to its own capability and/or traffic demand.

In a possible implementation, the processor is configured to read and execute the programs in the memory to: determine a preamble group corresponding to the operating bandwidth of the terminal according to a correspondence relationship between preamble groups and operating bandwidths, or determine a preamble group corresponding to the numerology of the terminal according to a correspondence relationship between preamble groups and numerologies; and select a preamble from the determined preamble group, and transmit it as the random access request.

In a possible implementation, the processor is configured to read and execute the programs in the memory to: determine a resource group corresponding to the operating bandwidth of the terminal according to a correspondence relationship between resource groups and operating bandwidths, or determine a resource group corresponding to the numerology of the terminal according to a correspondence relationship between resource groups and numerologies; and control the transceiver to transmit the random access request over a transmission resource in the determined resource group.

In a possible implementation, the processor is configured to read and execute the programs in the memory to: control the transceiver to transmit the random access request over a transmission resource in the operating bandwidth of the terminal; or control the transceiver to transmit the random access request over a transmission resource in an operating bandwidth of the numerology of the terminal, or a transmission resource in a Transmission Time Interval (TTI) with a sub-frame type of the numerology of the terminal.

In a possible implementation, the processor is further configured to read and execute the programs in the memory to control the transceiver to transmit uplink transmission scheduled by the random access response using the transmission parameter; and to control the transceiver to receive a contention resolution message using the transmission parameter.

Based upon the same inventive idea, an embodiment of the invention further provides a network-side transmission point, and since the network-side transmission point addresses the problem under a similar principle to the random access method as illustrated in FIG. 3, reference can be made to the implementation of the method for an implementation of the network-side transmission point, and a repeated description thereof will be omitted here.

Figure 14:
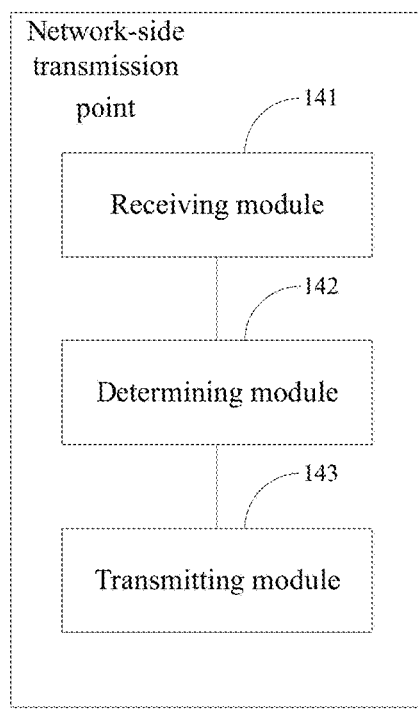
FIG. 14 is a schematic diagram of a network-side transmission point according to an embodiment of the invention.

In an embodiment as illustrated in FIG. 14, there is provided a network-side transmission point including: a receiving module 141 configured to receive a random access request; a determining module 142 configured to determine a transmission parameter for transmitting a random access response corresponding to the random access request; and a transmitting module 143 configured to transmit the random access response using the transmission parameter.

In a possible implementation, the transmission parameter is preset, or the transmission parameter is determined by the network-side transmission point on the basis of the random access request.

In a possible implementation, the determining module is configured to: determine an operating bandwidth corresponding to a preamble group including a preamble in the random access request according to a correspondence relationship between preamble groups and operating bandwidths, and determine the determined operating bandwidth as an operating bandwidth for transmitting the random access response; or determine a numerology corresponding to a preamble group including a preamble in the random access request according to a correspondence relationship between preamble groups and numerologies, and determine the determined numerology as a numerology for transmitting the random access response.

In a possible implementation, the determining module is configured to: determine an operating bandwidth corresponding to a resource group including a transmission resource over which the random access request is received, according to a correspondence relationship between resource groups and operating bandwidths, and determine the determined operating bandwidth as an operating bandwidth for transmitting the random access response; or determine a numerology corresponding to a resource group including a transmission resource over which the random access request is received, according to a correspondence relationship between resource groups and numerologies, and determine the determined numerology as a numerology for transmitting the random access response.

In a possible implementation, the determining module is configured to: determine an operating bandwidth including a transmission resource over which the random access request is received, as an operating bandwidth for transmitting the random access response; or determine a numerology of an operating bandwidth including a transmission resource over which the random access request is received, as a numerology for transmitting the random access response; or determine a sub-frame type of a TTI including a transmission resource over which the random access request is received, and determine a numerology of the sub-frame type as a numerology for transmitting the random access response.

In a possible implementation, the receiving module is further configured to receive uplink transmission scheduled by the random access response using the transmission parameter; and the transmitting module is further configured to transmit a contention resolution message using the transmission parameter.

Figure 15:
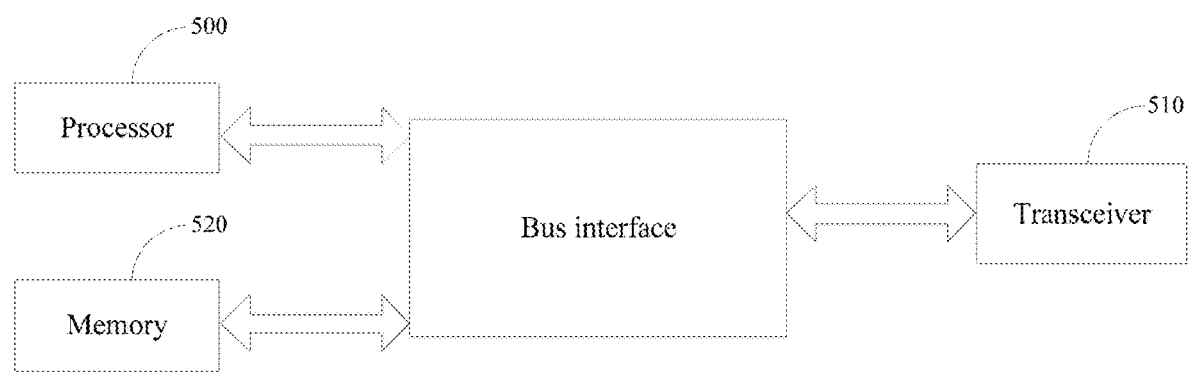
FIG. 15 is a schematic diagram of another network-side transmission point according to an embodiment of the invention.

In an embodiment as illustrated in FIG. 15, there is provided another network-side transmission point including a processor 500, a transceiver 510, and a memory 520, where the processor 500 is configured to read and execute programs in the memory 520 to: receive a random access request through the transceiver; determine a transmission parameter for transmitting a random access response corresponding to the random access request; and control the transceiver to transmit the random access response using the transmission parameter; and the transceiver is configured to receive and transmit data under the control of the processor.

Here in FIG. 15, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a transmitter and a receiver, which are units for communication with various other devices over a transmission medium. The processor 500 is responsible for managing the bus architecture and performing normal processes, and the memory 520 can store data for use by the processor 500 in performing the operations.

In a possible implementation, the transmission parameter is preset, or the transmission parameter is determined by the network-side transmission point according to the random access request.

In a possible implementation, the processor is configured to read and execute the programs in the memory to: determine an operating bandwidth corresponding to a preamble group including a preamble in the random access request according to a correspondence relationship between preamble groups and operating bandwidths, and determine the determined operating bandwidth as an operating bandwidth for transmitting the random access response; or determine a numerology corresponding to a preamble group including a preamble in the random access request according to a correspondence relationship between preamble groups and numerologies, and determine the determined numerology as a numerology for transmitting the random access response.

In a possible implementation, the processor is configured to read and execute the programs in the memory to: determine an operating bandwidth corresponding to a resource group including a transmission resource over which the random access request is received, according to a correspondence relationship between resource groups and operating bandwidths, and determine the determined operating bandwidth as an operating bandwidth for transmitting the random access response; or determine a numerology corresponding to a resource group including a transmission resource over which the random access request is received, according to a correspondence relationship between resource groups and numerologies, and determine the determined numerology as a numerology for transmitting the random access response.

In a possible implementation, the processor is configured to read and execute the programs in the memory to: determine an operating bandwidth including a transmission resource over which the random access request is received by the transceiver, as an operating bandwidth for transmitting the random access response; or determine a numerology of an operating bandwidth including a transmission resource over which the random access request is received by the transceiver, as a numerology for transmitting the random access response; or determine a sub-frame type of a TTI including a transmission resource over which the random access request is received, and determine a numerology of the sub-frame type as a numerology for transmitting the random access response.

In a possible implementation, the processor is configured to read and execute the programs in the memory to control the transceiver to receive uplink transmission scheduled by the random access response using the transmission parameter; and to control the transceiver to transmit a contention resolution message using the transmission parameter.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A random access method applied to a terminal in a 5G system, wherein the 5G system supports a plurality of operating bandwidths, or the 5G system supports a plurality of operating bandwidths and a plurality of sets of numerologies, wherein an operating bandwidth is smaller than a system bandwidth of the 5G system; and the method comprises:
    determining, by the terminal, a transmission parameter for the terminal to transmit data, wherein the transmission parameter comprises an operating bandwidth of the terminal, or the transmission parameter comprises an operating bandwidth of the terminal and a numerology used by the terminal; wherein the numerology comprises at least one of a sub-carrier spacing, or a symbol length; wherein the terminal is any one of terminals in the 5G system, the operating bandwidth of the terminal is a preset operating bandwidth which is an operating bandwidth of a terminal with a minimal reception bandwidth capability, and the numerology used by the terminal is a preset numerology;
    transmitting, by the terminal, a random access request according to the transmission parameter, to a network-side transmission point; and
    receiving, by the terminal using the transmission parameter, a random access response corresponding to the random access request and sent by the network-side transmission point using the same transmission parameter as the terminal;
    wherein transmitting, by the terminal, the random access request according to the transmission parameter comprises:
    transmitting, by the terminal, the random access request over a transmission resource in a Transmission Time Interval (TTI) with a sub-frame type of the numerology used by the terminal.

2. The method according to claim 1, wherein transmitting, by the terminal, the random access request according to the transmission parameter comprises:
    determining, by the terminal, a preamble group corresponding to the operating bandwidth of the terminal according to a correspondence relationship between preamble groups and operating bandwidths, or determining a preamble group corresponding to the numerology used by the terminal according to a correspondence relationship between preamble groups and numerologies; and
    selecting, by the terminal, a preamble from the determined preamble group, and transmitting it as the random access request.

3. The method according to claim 1, wherein transmitting, by the terminal, the random access request according to the transmission parameter comprises:
    determining, by the terminal, a resource group corresponding to the operating bandwidth of the terminal according to a correspondence relationship between resource groups and operating bandwidths, or determining a resource group corresponding to the numerology used by the terminal according to a correspondence relationship between resource groups and numerologies; and
    transmitting, by the terminal, the random access request over a transmission resource in the determined resource group.

4. The method according to claim 1, wherein the method further comprises:
    transmitting, by the terminal, uplink transmission scheduled by the random access response using the transmission parameter; and
    receiving, by the terminal, a contention resolution message using the transmission parameter.

5. A random access method applied to a network-side transmission point in a 5G system, wherein the 5G system supports a plurality of operating bandwidths, or the 5G system supports a plurality of operating bandwidths and a plurality of sets of numerologies, wherein an operating bandwidth is smaller than a system bandwidth of the 5G system; and the method comprises:
    determining, by the network-side transmission point, a transmission parameter for transmitting a random access response corresponding to a random access request upon reception of the random access request from a terminal; wherein the transmission parameter comprises an operating bandwidth of the terminal, or the transmission parameter comprises an operating bandwidth of the terminal and a numerology used by the terminal; wherein the numerology comprises at least one of a sub-carrier spacing, or a symbol length; wherein the terminal is any one of terminals in the 5G system, the operating bandwidth of the terminal is a preset operating bandwidth which is an operating bandwidth of a terminal with a minimal reception bandwidth capability, and the numerology used by the terminal is a preset numerology; and
    transmitting, by the network-side transmission point, the random access response using the transmission parameter, to the terminal;
    wherein determining, by the network-side transmission point, the transmission parameter for transmitting the random access response corresponding to the random access request comprises:
    determining, by the network-side transmission point, a sub-frame type of a Transmission Time Interval (TTI) comprising a transmission resource over which the random access request is received, and determining a numerology of the sub-frame type as a numerology for transmitting the random access response.

6. The method according to claim 5, wherein determining, by the network-side transmission point, the transmission parameter for transmitting the random access response corresponding to the random access request comprises:
- determining, by the network-side transmission point, an operating bandwidth corresponding to a preamble group comprising a preamble in the random access request according to a correspondence relationship between preamble groups and operating bandwidths, and determining the determined operating bandwidth as an operating bandwidth for transmitting the random access response; or
- determining, by the network-side transmission point, a numerology corresponding to a preamble group comprising a preamble in the random access request according to a correspondence relationship between preamble groups and numerologies, and determining the determined numerology as a numerology for transmitting the random access response.

7. The method according to claim 5, wherein determining, by the network-side transmission point, the transmission parameter for transmitting the random access response corresponding to the random access request comprises:
- determining, by the network-side transmission point, an operating bandwidth corresponding to a resource group comprising a transmission resource over which the random access request is received, according to a correspondence relationship between resource groups and operating bandwidths, and determining the determined operating bandwidth as an operating bandwidth for transmitting the random access response; or
- determining, by the network-side transmission point, a numerology corresponding to a resource group comprising a transmission resource over which the random access request is received, according to a correspondence relationship between resource groups and numerologies, and determining the determined numerology as a numerology for transmitting the random access response.

8. The method according to claim 5, wherein the method further comprises:
- receiving, by the network-side transmission point, uplink transmission scheduled by the random access response using the transmission parameter; and
- transmitting, by the network-side transmission point, a contention resolution message using the transmission parameter.

9. A network-side transmission point in a 5G system, wherein the 5G system supports a plurality of operating bandwidths, or the 5G system supports a plurality of operating bandwidths and a plurality of sets of numerologies, wherein an operating bandwidth is a part or all of a system bandwidth of the 5G system; and the network-side transmission point comprises at least one processor and a memory; wherein the memory is configured to store readable program codes, and the at least one processor is configured to execute the readable program codes to perform operations of the method according to claim 5.

10. The network-side transmission point according to claim 9, wherein the at least one processor is further configured to execute the readable program codes to:
- determine an operating bandwidth corresponding to a preamble group comprising a preamble in the random access request according to a correspondence relationship between preamble groups and operating bandwidths, and determine the determined operating bandwidth as an operating bandwidth for transmitting the random access response; or
- determine a numerology corresponding to a preamble group comprising a preamble in the random access request according to a correspondence relationship between preamble groups and numerologies, and determine the determined numerology as a numerology for transmitting the random access response;
- or, the at least one processor is further configured to execute the readable program codes to:
- determine an operating bandwidth corresponding to a resource group comprising a transmission resource over which the random access request is received, according to a correspondence relationship between resource groups and operating bandwidths, and determine the determined operating bandwidth as an operating bandwidth for transmitting the random access response; or
- determine a numerology corresponding to a resource group comprising a transmission resource over which the random access request is received, according to a correspondence relationship between resource groups and numerologies, and determine the determined numerology as a numerology for transmitting the random access response.

11. A terminal in a 5G system, wherein the 5G system supports a plurality of operating bandwidths, or the 5G system supports a plurality of operating bandwidths and a plurality of sets of numerologies, wherein an operating bandwidth is smaller than a system bandwidth of the 5G system; and the terminal comprises at least one processor and a memory; wherein the memory is configured to store readable program codes, and the at least one processor is configured to execute the readable program codes to:
- determine a transmission parameter for the terminal to transmit data, wherein the transmission parameter comprises an operating bandwidth of the terminal, or the transmission parameter comprises an operating bandwidth of the terminal and a numerology used by the terminal; wherein the numerology comprises at least one of a sub-carrier spacing, or a symbol length; wherein the terminal is any one of terminals in the 5G system, the operating bandwidth of the terminal is a preset operating bandwidth which is an operating bandwidth of a terminal with a minimal reception bandwidth capability, and the numerology used by the terminal is a preset numerology;
- transmit a random access request according to the transmission parameter, to a network-side transmission point; and
- receive, using the transmission parameter, a random access response corresponding to the random access request and sent by the network-side transmission point using the same transmission parameter as the terminal;
- wherein the at least one processor is further configured to execute the readable program codes to:
- transmit the random access request over a transmission resource in a Transmission Time Interval (TTI) with a sub-frame type of the numerology used by the terminal.

12. The terminal according to claim 11, wherein the at least one processor is further configured to execute the readable program codes to:
- determine a preamble group corresponding to the operating bandwidth of the terminal according to a correspondence relationship between preamble groups and operating bandwidths, or determine a preamble group corresponding to the numerology used by the terminal according to a correspondence relationship between preamble groups and numerologies; and select a preamble from the determined preamble group, and transmit it as the random access request.

13. The terminal according to claim 11, wherein the at least one processor is further configured to execute the readable program codes to:
   determine a resource group corresponding to the operating bandwidth of the terminal according to a correspondence relationship between resource groups and operating bandwidths, or determine a resource group corresponding to the numerology used by the terminal according to a correspondence relationship between resource groups and numerologies; and
   transmit the random access request over a transmission resource in the determined resource group.

14. The terminal according to claim 11, wherein the at least one processor is further configured to execute the readable program codes to transmit uplink transmission scheduled by the random access response using the transmission parameter; and
   receive a contention resolution message using the transmission parameter.

* * * * *